United States Patent
Biaggi et al.

(10) Patent No.: US 9,127,792 B2
(45) Date of Patent: Sep. 8, 2015

(54) FLEXIBLE PIPE FOR CONVEYING A CRYOGENIC FLUID AND ASSOCIATED PRODUCTION METHOD

(75) Inventors: Jean-Pascal Biaggi, La Celle Saint Could (FR); Philippe Espinasse, Bihorel (FR)

(73) Assignee: TECHNIP FRANCE (FR)

( * ) Notice: Subject to any disclaimer, the term of this patent is extended or adjusted under 35 U.S.C. 154(b) by 259 days.

(21) Appl. No.: 13/576,097

(22) PCT Filed: Jan. 31, 2011

(86) PCT No.: PCT/FR2011/050185
§ 371 (c)(1),
(2), (4) Date: Jan. 16, 2013

(87) PCT Pub. No.: WO2011/092440
PCT Pub. Date: Aug. 4, 2011

(65) Prior Publication Data
US 2013/0105026 A1   May 2, 2013

(30) Foreign Application Priority Data
Feb. 1, 2010   (FR) ...................................... 10 50665

(51) Int. Cl.
*F16L 9/14* (2006.01)
*F16L 9/18* (2006.01)
(Continued)

(52) U.S. Cl.
CPC ............... *F16L 11/15* (2013.01); *F16L 11/115* (2013.01); *F16L 11/18* (2013.01); *F16L 59/141* (2013.01); *F16L 59/153* (2013.01); *Y10T 29/49826* (2015.01)

(58) Field of Classification Search
CPC ......... F16L 11/15; F16L 11/115; F16L 11/18; F16L 59/141; F16L 59/153

USPC .......... 222/121, 149, 173; 138/113, 120, 121, 138/155, 173
See application file for complete search history.

(56) References Cited

U.S. PATENT DOCUMENTS

| 1,145,434 | A | | 7/1915 | Pechstein |
| 2,136,770 | A | * | 11/1938 | Witzenmann .............. 285/147.1 |

(Continued)

FOREIGN PATENT DOCUMENTS

| GB | 2 051 297 A | 1/1981 |
| WO | WO 2007/026168 A1 | 3/2007 |

(Continued)

OTHER PUBLICATIONS

International Search Report dated Mar. 31, 2011 issued in corresponding international application No. PCT/FR2011/050185d.

(Continued)

*Primary Examiner* — Paul R Durand
*Assistant Examiner* — Vishal Pancholi
(74) *Attorney, Agent, or Firm* — Ostrolenk Faber LLP

(57) ABSTRACT

A pipe (10) including an inner corrugated tube (16) having an axis A-A', defining a plurality of corrugations (30) leading radially towards the axis (A-A') and at least one tensile armor layer (18), arranged around the corrugated tube (16). It includes at least one thermal insulation layer (44, 46), arranged around the armor layer (18). The pipe (10) comprises an inner sheath (14) for guiding the flow of cryogenic fluid arranged in the corrugated tube (16), the inner sheath (14) being made up of a plurality of cylindrical segments (50). Each cylindrical segment (50) of the inner sheath (14) covers a plurality of successive corrugations (30) of the corrugated tube (16) and includes an outer abutment (54) for axial wedging received in a corrugation (30) of the corrugated tube (16).

11 Claims, 4 Drawing Sheets

(51) Int. Cl.
*F16L 11/15* (2006.01)
*F16L 11/115* (2006.01)
*F16L 11/18* (2006.01)
*F16L 59/14* (2006.01)
*F16L 59/153* (2006.01)

(56) References Cited

U.S. PATENT DOCUMENTS 2,256,386 A 9/1941 Farrar et al.
2,599,210 A 6/1952 Thompson
3,908,703 A * 9/1975 Bournazel et al. ............ 138/120
4,204,562 A 5/1980 Kelly
4,344,462 A * 8/1982 Aubert et al. ................. 138/130

FOREIGN PATENT DOCUMENTS

WO WO 2007/055583 A1 5/2007
WO WO 2010/106110 A2 9/2010

OTHER PUBLICATIONS

European Office Action dated Sep. 7, 2012 in corresponding European Application No. 11706890.8.

* cited by examiner

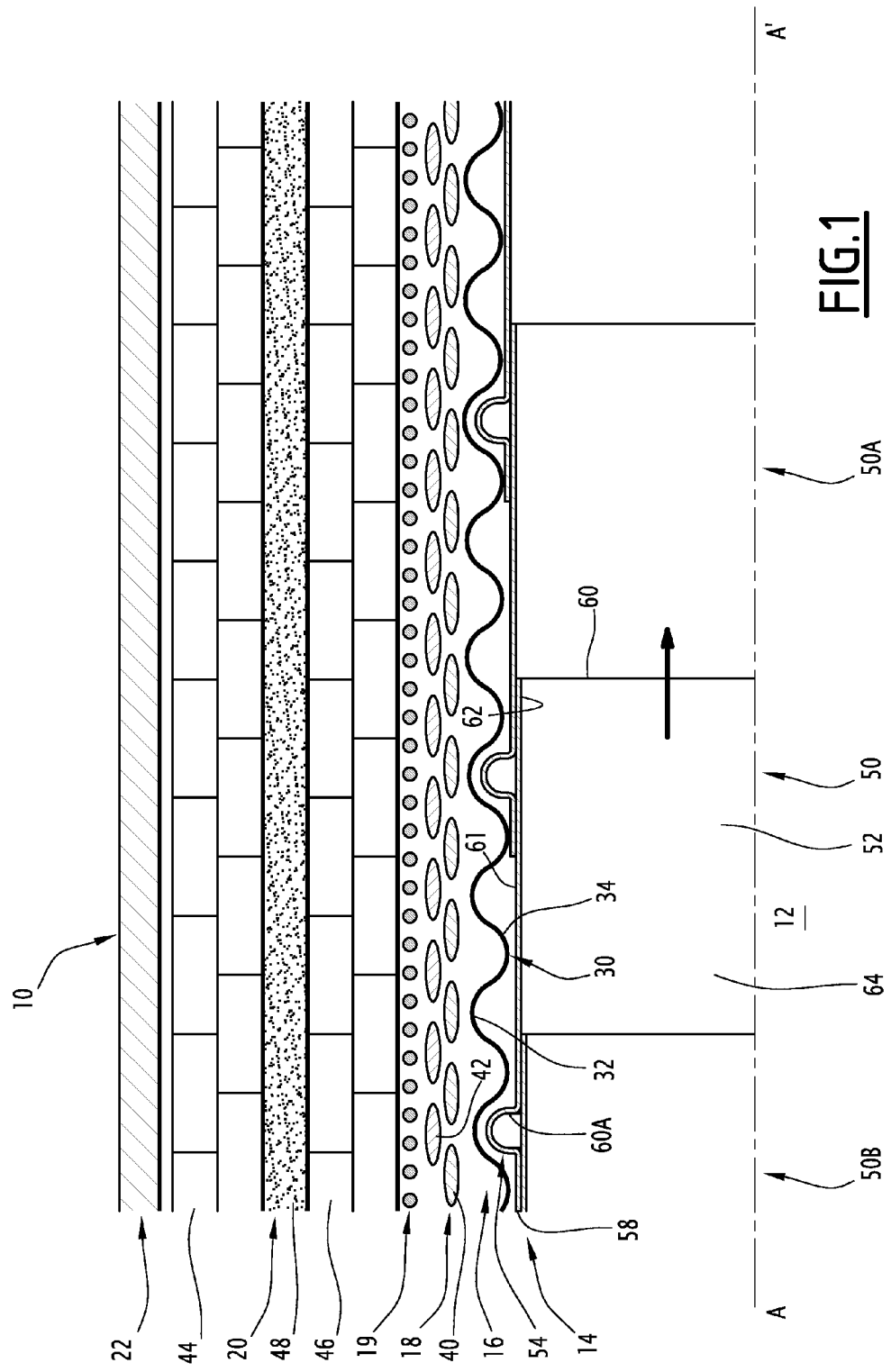

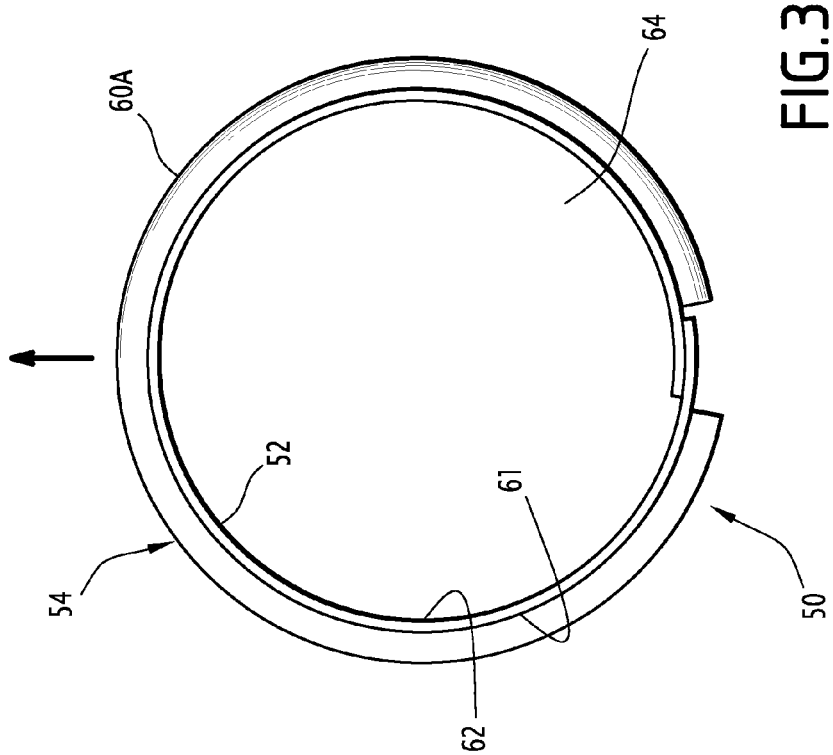
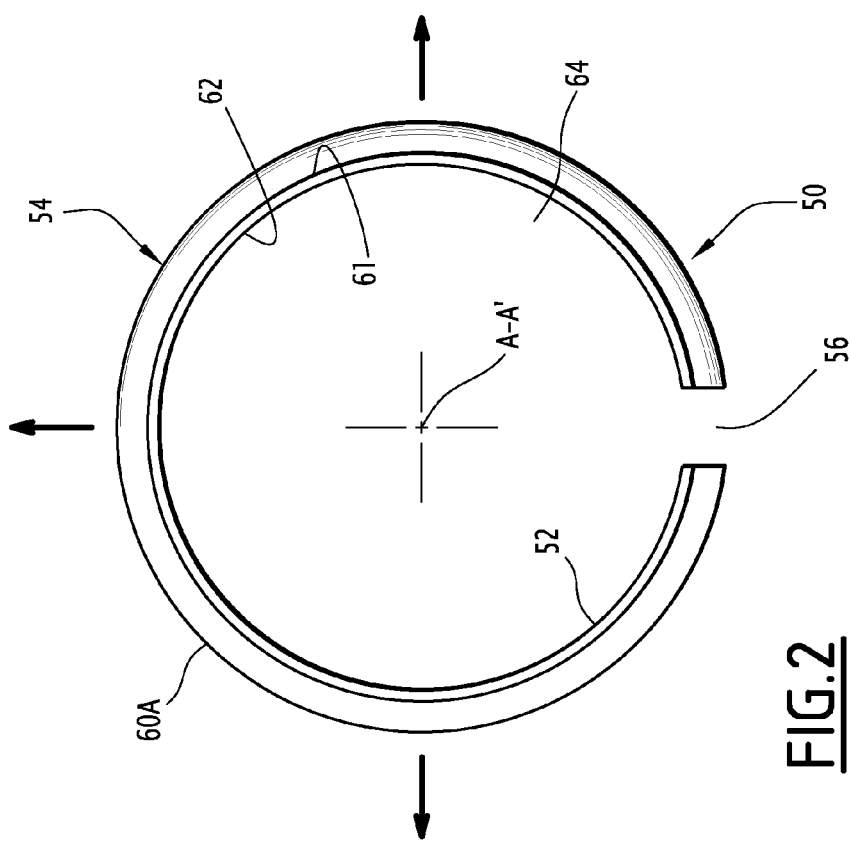

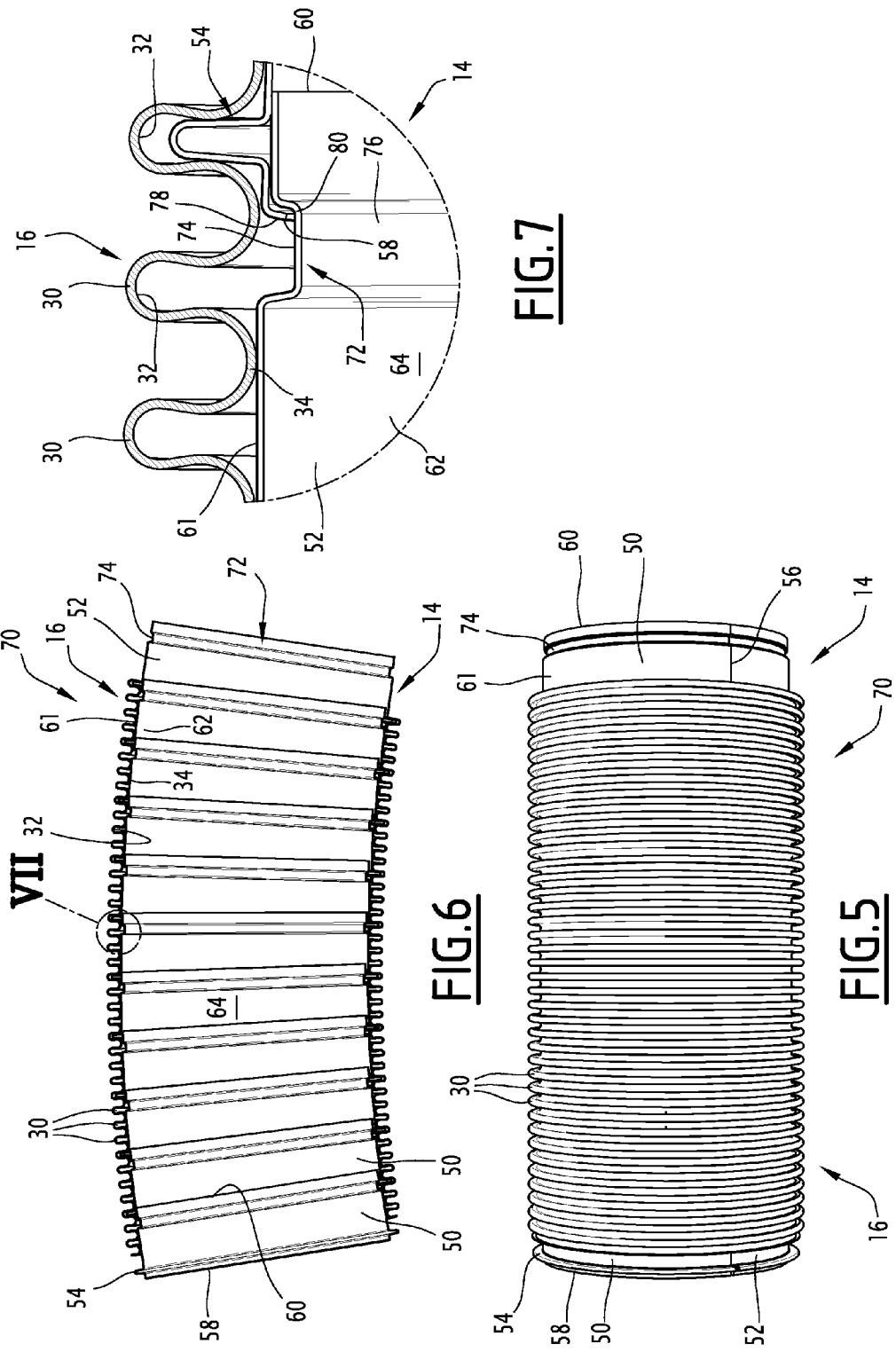

FLEXIBLE PIPE FOR CONVEYING A CRYOGENIC FLUID AND ASSOCIATED PRODUCTION METHOD

CROSS REFERENCE TO RELATED APPLICATIONS

The present application is a 35 U.S.C. §371 National Phase conversion of PCT/FR2011/050185, filed Jan. 31, 2011, which claims benefit of French Application No. 10 50665, filed Feb. 1, 2010, the disclosures of which are incorporated herein by reference. The PCT International Application was published in the French language.

TECHNICAL FIELD

The present invention relates to a flexible pipe for conveying a cryogenic fluid including:
- an inner corrugated tube having an axis, defining a plurality of corrugations opening radially towards the axis;
- at least one tensile armor layer, arranged around the corrugated tube;
- and at least one thermal insulation layer, arranged around the armor layer.

BACKGROUND OF THE INVENTION

Such a pipe is intended to convey a cryogenic fluid for example coming from a gas liquefaction method. The conveyed fluid is for example liquefied natural gas having a boiling temperature below 163° C.

More generally, a cryogenic fluid conveyed by the pipe has a boiling temperature below 0° C.

Natural gas extracted from the ground is a significant source of fuel that can be exploited.

It is known to use pipelines to convey natural gas in gaseous form from its production site to its exploitation site. However, in many cases, in particular when the production site is located in an expanse of water, it is simpler and more cost-effective to convey the natural gas in liquid form, so as to decrease its volume during transport and facilitate its storage and handling.

However, the handling of cryogenic fluids, and in particular the unloading of a cryogenic fluid from a liquefaction plant toward a carrier ship, or from a carrier ship toward a land-based storage facility, must be done near the coast, often using articulated connecting arms connecting the ship to the plant or the storage facility.

Such articulated arms are not suited to cases where the loading or unloading operations are done far from the coast, in relatively unprotected areas, in particular when the liquefaction units are located on floating facilities of the FLNG type.

In that case, the liquefied natural gas can only be unloaded when the weather conditions are calm, which makes the exploitation difficult.

Furthermore, the flexible pipes of the connected or not connected type known for unloading hydrocarbonaceous fluids at ambient temperature are not able to convey cryogenic fluids at temperatures below −40° C./−50° C., given the very low temperatures of the cryogenic fluids and their particular properties.

To offset this problem, EP 1 945 983 describes a flexible pipe provided to convey cryogenic fluid.

Such a pipe comprises a non-sealed stapled inner tube offering resistance to the outside pressure. This pipe comprises, from the inside toward the outside, an inner shell designed to withstand the outside pressure, an impermeable layer made up of a fine polymer film in direct contact with the shell, a layer of insulation, and a plastic sheath withstanding low temperatures. The insulation layer makes it possible to create a sufficient heat gradient to be covered by the plastic sheath. The stapled inner tube is covered with insulation and outwardly reinforced by a pressure arch and tensile armor layers.

To ensure proper thermal insulation and prevent the cryogenic fluid from heating or ice from forming on the outside of the flexible pipe, thermal insulation layers are provided around the tensile armor layers to keep the contact surface of the flexible pipe with the water at a high enough temperature to avoid the formation of ice.

However, such a structure is not fully satisfactory due to the complexity of its inner structure.

A flexible pipe by the Applicant for conveying cryogenic fluid is described in "LNG Transfer—Cryogenic flexible pipe for transfer—May-June 2000." This flexible pipe comprises, from the inside toward the outside, a corrugated tube that can seal against the cryogenic fluid and ensure resistance to the internal pressure, tensile armor layers able to bear the axial loads applied on the pipe, and a set of thermal insulation layers.

However, such flexible pipes are not fully satisfactory with regard to the pressure loss of the fluid circulating in the pipe. These pipes are therefore only usable in practice over a relatively small length, which can make its industrial use difficult.

SUMMARY OF THE INVENTION

One aim of the invention is to obtain a flexible transport pipe that is adapted to the transport of cryogenic fluids and that nevertheless has a sufficient length to be industrialized without harming the transport of the fluid present in the pipe.

To that end, the invention relates to a pipe of the aforementioned type, characterized in that the pipe comprises an inner sheath for guiding the flow of cryogenic fluid arranged in the corrugated tube, the inner sheath being made up of a plurality of cylindrical segments,
each cylindrical segment of the inner sheath covering a plurality of successive corrugations of the corrugated tube and including an outer abutment for axial wedging received in a corrugation of the corrugated tube.

The pipe according to the invention may comprise one or more of the following features, considered alone or according to all technically possible combinations:
- each cylindrical segment defines an inner cylindrical surface with no asperities spaced axially away from the outer abutment;
- each cylindrical segment has a downstream edge engaged through an upstream edge of an adjacent cylindrical segment;
- each outer abutment extends angularly over an angle larger than 90°, advantageously larger than 180° around the axis;
- each cylindrical segment comprises a cylindrical body made in a single piece with the outer abutment, the outer abutment being formed through local deformation of the cylindrical body;
- the outer abutment of each cylindrical segment extends axially across from a portion of an adjacent cylindrical segment;
- the outer surface of each outer abutment is covered by a plastic sheath designed to come into contact with the corrugated tube;

each cylindrical segment is elastically deformable toward the axis between a radially expanded idle configuration and a radially contracted configuration, each cylindrical segment occupying its radially contracted configuration when it is inserted into the corrugated tube;

each cylindrical segment has a slit along a generatrix over its entire length;

the pipe comprises a spiral layer for maintaining the tensile armor layer, the spiral layer being inserted between the armor layer and the thermal insulation layer;

the adjacent cylindrical segments of the sheath are slidingly mounted relative to one another along the axis;

the cylindrical segments are disjointed; and each segment can be moved relative to the other segments completely away from the other segments, without mechanical rupture of the segment.

The invention also relates to a method for manufacturing a flexible pipe for conveying a cryogenic fluid, comprising the following steps:

providing a corrugated inner tube with an axis defining a plurality of corrugations opening radially towards the axis;

arranging at least one tensile armor layer around the corrugated tube;

placing at least one thermal insulation layer around the armor layer;

characterized in that it comprises a step for arranging an inner sheath for guiding the flow of cryogenic fluid, the inner sheath being made up of a plurality of cylindrical segments, each cylindrical segment of the inner sheath covering a plurality of successive corrugations of the corrugated tube and including an outer abutment for axial wedging received in a corrugation of the corrugated tube.

BRIEF DESCRIPTION OF THE DRAWINGS

The invention will be better understood upon reading the following description, provided solely as an example, and done in reference to the appended drawings, in which:

FIG. 1 is a partial half-sectional view of the wall of a first flexible pipe according to the invention;

FIG. 2 is an end view of a cylindrical segment of the inner sheath of the pipe of FIG. 1;

FIG. 3 is a view similar to FIG. 2 of an alternative cylindrical segment;

FIG. 5 is a side view of a corrugated tube section and an inner sheath of a second pipe according to the invention;

FIG. 6 is a cross-sectional view along a median axial plane of the section shown in FIG. 5;

FIG. 7 is a view of a detail marked vii in FIG. 6.

DESCRIPTION OF PREFERRED EMBODIMENTS

Figure 4:
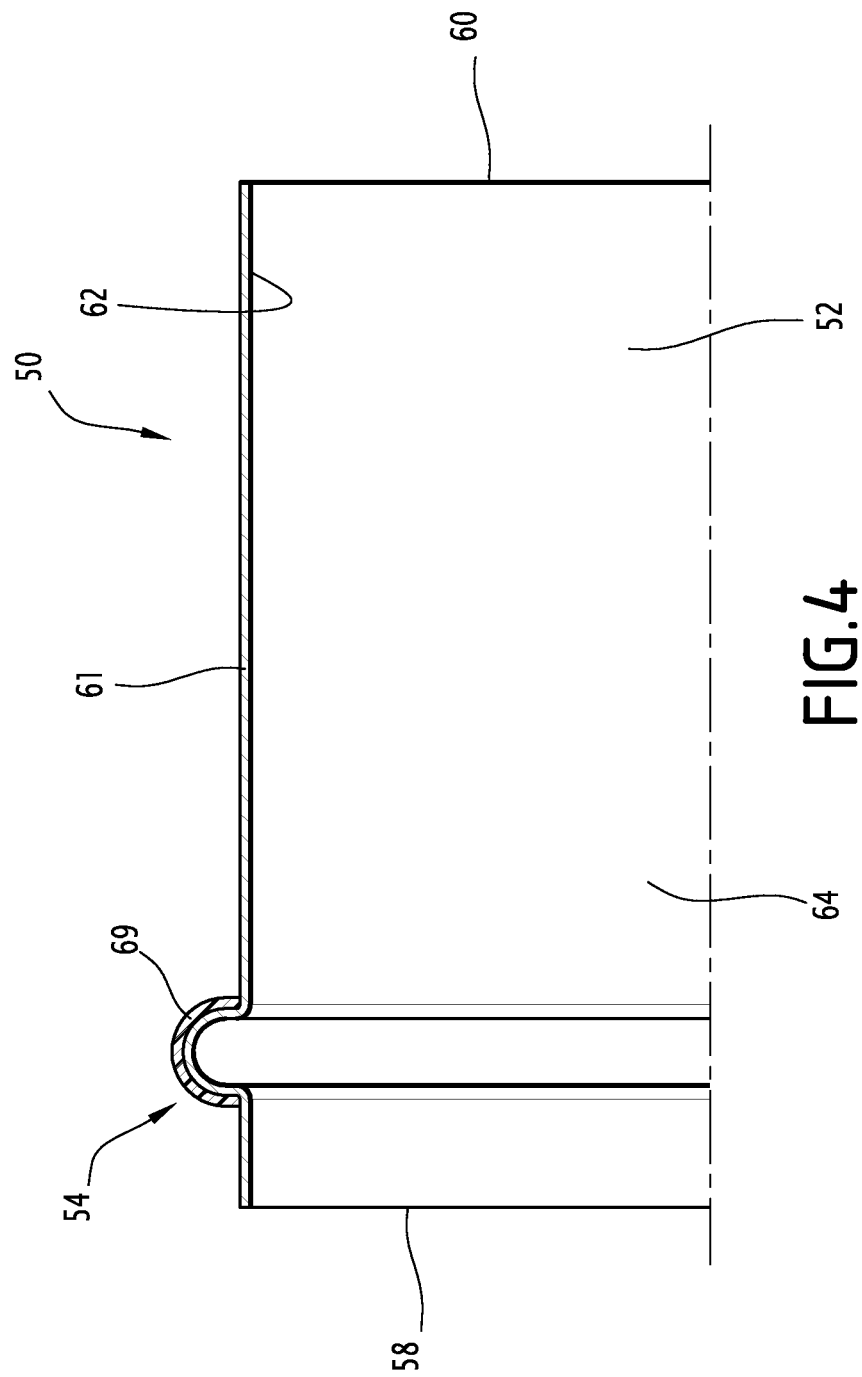
FIG. 4 is a partial cross-sectional view along a median axial plane of a segment of an alternative pipe according to the invention.

A first cryogenic pipe 10 according to the invention is partially shown in section along a median axial plane in FIG. 1.

This pipe 10 is designed to convey a cryogenic fluid such as a liquefied gas, advantageously liquefied natural gas, between its upstream end and its downstream end.

The pipe 10 thus extends over a length of more than 30 meters, and in particular comprises between 50 meters and 300 meters. It delimits a central passage 12 for the circulation of a cryogenic fluid, with local axis A-A'.

Such a flexible pipe has a relatively small minimal bending radius (MBR), for example several meters, which makes it able to be wound and unwound reversibly without significant plastic deformation on a drum or basket borne by a ship.

The pipe 10 according to the invention comprises, from its axis A-A' toward the outside, an inner sheath 14 for guiding fluid, a corrugated pipe 16 able to ensure sealing against the fluid and resistance to the internal pressure, and tensile armor layers 18 able to support the axial loads applied on the pipe 10.

The pipe 10 also comprises an optional spiral layer 19 for maintaining the armor layers 18, a set 20 of thermal insulation layers able to keep the temperature outside the pipe above 0° C., and an optional external sealing layer 22, preventing water penetration and possibly providing additional thermal insulation.

The corrugated inner tube 16 is formed from a metal base. To ensure good temperature resistance, at the circulation temperature of the cryogenic fluid, this tube is for example made from 304 L or 316 L steel.

The tube 16 advantageously has an average diameter larger than 30 centimeters, for example comprised between 30 centimeters and 60 centimeters.

In moving axially parallel to the axis A-A', it has a plurality of corrugations 30 with a pitch smaller than at least ten times the average diameter of the tube 16.

The corrugations 30 of the pipe are formed by a series of hollows 32 and bosses 34 axially delimiting the hollows 32.

The hollows 32 open radially toward the axis A-A'. The maximum radial depth of the hollows 32, considered perpendicular to the axis A-A' between the apex of a boss 34 and the bottom of the hollow 32, is smaller than twenty times the average diameter of the tube 16.

In the example shown in FIG. 1, the hollows 32 form a series of disjointed annular grooves parallel to one another. Alternatively, the hollows 32 are formed by a continuous helical groove with a pitch equal to the pitch of the corrugations 30.

The tube 16 is for example formed by the end-to-end assembly of a plurality of corrugated tube sections, each section for example being formed by stamping. Each corrugated tube section includes a plurality of corrugations, for example more than ten corrugations 30. Each corrugated tube section defines a continuous and sealed inner surface over its length and all of its periphery.

Once they are assembled together, for example by welding, the corrugated tube sections 16 form a continuous pipe sealed over its entire length.

Alternatively, the tube 16 is formed by winding a strip folded along at least one edge to be stapled on an adjacent edge of the strip.

The tube 16 thus offers resistance to the internal pressure, while guaranteeing a certain flexibility, through the deformation offered by the corrugations 30 of the tube 16, in particular at low usage temperatures.

The tensile armor layers 18 are formed by a cross-fiber helical winding, for example from a synthetic material such as polyester, or metal. Thus, a first armor layer 40 is for example wound in an helix around the axis A-A' with an helix angle +α comprised between 20° and 45° relative to the axis A-A'. A second armor layer 42 is wound, for example with an helix angle −α, outside the first layer 40 in contact with that layer 40.

The armor layers 18 advantageously have a thickness comprised between 1 mm and 4 mm. They are not connected to the corrugated tube 16.

The optional spiral layer 19 is wound around armor layers 40, 42, with a winding angle smaller than that of the armor layers. Thus, the winding angle is for example between 2° and 5°.

The spiral layer 19 is made with a base of a filiform element, for example with a base of plastic fibers, such as polyester fibers.

The spiral layer 19 reinforces the armor layers 18 and prevents the structure of those layers 18 from becoming disorganized during use of the pipe or during bending thereof.

The spiral layer 19 is not connected to the armor layers 18.

In this example, the thermal insulation assembly 20 is made up of two similar insulation layers 44, 46 separated by an intermediate sealing layer 48.

The insulation layers 44, 46 are made from a solid, thermally insulating material having a thermal conductivity of less than at least 300 times the thermal conductivity of the inner tube 16.

The layers 44, 46 are for example made up of a foam, advantageously a polyolefin foam, or an aerogel.

In the example shown in FIG. 1, the insulation layers 44, 46 are for example made from polyethylene foam strips wound around the axis A-A'.

The intermediate sealing layer 48 is advantageously made from an adhesive rubber strip. It ensures additional sealing for the natural gas in the event the inner tube 16 no longer provides that sealing.

The sealing assembly 20 has a thickness greater than the thickness of the inner tube 16, for example between 3 cm and 15 cm.

Its overall thermal insulation coefficient ensures that the inner temperature in the passage 12 is kept at a value below or substantially equal to the boiling temperature of the cryogenic fluid, while avoiding ice formation on the outside of the pipe 10.

The sealing assembly 20 is not connected to the spiral layer 19 or the armor layer 18.

The outer layer 22 is designed to provide general sealing between the outside of the pipe 10 and the inside of the pipe 10, to prevent water penetration in the pipe 10. It is for example made up of spiral strips of rubber PVC or aramid, such as KEVLAR, or an extruded or sprayed thermoplastic sheath.

Advantageously, the outer layer 22 also comprises an additional thermal insulation sub-layer.

The outer layer 22 is not connected to the sealing assembly 20.

According to the invention, the inner sheath 14 is made up of a series of cylindrical segments 50 axially engaged in one another inside the corrugated tube 16.

The inner sheath 14 has a total length substantially equal to the total length of the corrugated tube 16.

Each segment 50 is generally cylindrical. It includes a radially expansible cylindrical body 52 with a axis A-A', and an outer abutment 54 for axial wedging on the corrugated tube 16.

As illustrated by FIG. 2, the body 52 delimits a longitudinal slit 56 extending between an upstream edge 58 and a downstream edge 60 of the body 52 over the entire length thereof.

The length of each cylindrical segment 50, between the upstream edge 58 and the downstream edge 60, is greater than at least twice the pitch of the corrugations 30. Thus, each segment covers a plurality of corrugations 30 when it is placed in the corrugated tube 16.

The abutment 54 is made integrally in a single piece with the cylindrical body 52. It is for example made by stamping or rolling. In the example shown in FIG. 2, the abutment 54 forms a substantially annular bead 60A extending over an angle of at least 90°, advantageously at least 180° along a circumference around the axis A-A'.

The abutment 54 has an axial reach, along the axis A-A', smaller than the axial reach of the hollow 32 of a corrugation 30 to be able to be received in that hollow 32. Thus, each segment is axially movable relative to the corrugated tube 16 over a given axial travel smaller than the pitch of the corrugations, defined by the axial travel of the abutment 54 in the hollow 32.

Furthermore, the abutment 54 has a radial reach, from a cylindrical end surface 61 of the body 52, smaller than the maximum depth of the hollow 32 in which it is received.

Spaced away from the abutment 54, the inner surface 62 and the outer surface 61 of the cylindrical body 52 substantially have no asperities, i.e. they do not comprise raised portions with a radial reach of more than 10% of the average thickness of the body 52, between the inner surface 62 and the outer surface 61.

The average thickness of the cylindrical body 52, between the surfaces 61 and 62, is in particular smaller than 2% of the inner diameter of the tube 16.

As partially illustrated in FIG. 2, each cylindrical section 50 can be radially contracted between an expanded idle position, shown in FIG. 2, in which the inner diameter delimited by the cylindrical body 52 is larger than the minimum diameter of the tube 16, and a position radially contracted toward the axis A-A', when the cylindrical segment 50 is received in the corrugated tube 16.

In the contracted position, the side edges of the slit 56 are in contact with one another or overlap partially as illustrated in the alternative shown in FIG. 3. The slit 56 is covered and the inner channel 64 delimited by the inner surface 62 emerges exclusively through the upstream edge 58 and the downstream edge 60 of the cylindrical body 52.

When the inner sheath 14 is mounted in the corrugated tube 16, the adjacent segments 50 are partially inserted into one another.

Thus, the downstream edge 60 of each segment 50 is slidingly received in the inner channel 64 of an adjacent downstream segment 50A. The cylindrical segment 50 thus radially covers the abutment 54 of the downstream cylindrical segment 50A toward the axis A-A'.

Likewise, the upstream segment 50B adjacent to the segment 50 is partially slidingly received in the inner channel 64 of the segment 50. A downstream portion of the segment 50B covers the abutment 54 of the segment 50 toward the axis A-A'.

Thus, the passage 12 is delimited by the inner surfaces 62 with substantially no asperities of the successive segments 50, which ensures minimal resistance to the flow of the cryogenic fluid from upstream to downstream, from left to right in FIG. 1.

In particular, the sheath 14 does not have any transverse surface oriented in the upstream direction in the passage 12, in particular near the inner surface 62 of each segment 50.

This also makes it possible to increase the length of the pipe 10 and to ensure effective conveyance of the cryogenic fluid with minimal pressure loss.

The inner sheath 14 remains bendable by relative sliding of the cylindrical sections 50 relative to one another.

Furthermore, each abutment 54 of a cylindrical segment 50 is received in a hollow 32 of a corrugation 30, which ensures axial wedging along the axis A-A' through cooperation with the bosses 34 adjacent to the hollows 32.

Thus, each cylindrical segment 50 is axially retained by the corrugated tube 16 against the flow of cryogenic fluid, and during any deformations of the pipe 10 by traction or bending.

A method for assembling a pipe 10 according to the invention will now be described.

Initially, the different sections of the corrugated tube 16 are provided. Each tube section 16 is then provided with a portion of the segments 50 of the inner sheath 14, before it is welded with another section.

To that end, the cylindrical segments 50 are successively transitioned from their retracted configurations. They are successively inserted into each inner tube section 16 to their desired axial position, starting from the segment 50 situated furthest downstream in the tube section 16.

When each segment 50 reaches its desired position, it is applied by elastic radial expansion on the corrugated tube 14. Each abutment 54 of a segment 50 is then housed in a hollow 32 of a corrugation 30 and the downstream edge 60 of each segment 50 is inserted through the upstream edge 58 of the adjacent segment 50A to cover the abutment 54 of the adjacent segment 50A.

Then, the different corrugated tube sections 16 are assembled to one another, for example by welding.

Once the assembly is done, the segments 50 situated at the ends of each inner tube section 16 are then placed in the continuous inner tube to complete the production of the inner sheath 14.

Once that is done, the armor layers 18 are wound around the inner tube 16 in a known manner. Then, the spiral layer 19 is optionally wound in a spiral around the armor layers 18.

Then, the first insulation layer 46, the intermediate layer 48, then the second insulation layer 44 are formed and arranged around armor layers 18.

Lastly, the outer sealing layer 22 is arranged around the sealing assembly 20.

In one alternative of the method, the inner tube 16 is assembled in its entirety before the cylindrical segments 50 are inserted into the tube 16 to form the sheath 14.

In an alternative shown in FIG. 4, the abutment 54 or the assembly 50 comprises a plastic outer sheath 69 able to reduce the friction with the corrugated tube 16. The sheath 69 is for example formed by a layer of nylon applied to the outside of the bead 60A.

In other alternatives, the spiral layer 19 and possibly the outer layer 22 are omitted.

In still other alternatives, the abutments 54 extend only over part of the circumference of the outer surface 61, for example over an angle smaller than 90°.

A section of corrugated tube 16 and inner sheath 14 of a second flexible pipe 70 according to the invention is shown in FIGS. 5 to 7.

The second flexible pipe 70 according to the invention differs from the first pipe 10 in that the cylindrical body 52 of each segment 50 has a peripheral annular constriction 72 in the vicinity of its downstream edge 60. The peripheral annular constriction 72 defines an annular groove 74 in the outer surface 61 and a peripheral protrusion 76 in the inner channel 64.

Away from the protrusion 76, the inner surface remains substantially free of asperities.

Unlike the first pipe 10, the upstream edge 58 has a peripheral retaining rim 78 that protrudes radially toward the axis A-A' over a transverse reach substantially equal to the depth of the groove 74.

The rim 78 is received in the groove 74 and abuts against an upstream shoulder 80 defined by the groove to axially retain each downstream segment 50 in relation to the adjacent upstream segment 50.

The adjacent segments 50 remain sliding relative to one another over a longitudinal travel substantially equal to the width of the groove 74 along the axis A-A'.

In this example, the tube 16 advantageously has hollows 32 with a depth at least equal to the pitch of the corrugations 30 to receive each abutment 54.

The radial reach of each abutment 54 is also substantially equal to the depth of the hollow 32.

It results directly from the above description that the segments 50 are disjointed. Thus, each cylindrical segment 50 can be moved relative to the other cylindrical segments 50, completely away from the other cylindrical segments 50, without mechanical rupture of the segment 50.

Each segment 50 is thus formed by a cylindrical wall axially delimited by an upstream edge 58 and a downstream edge 60, the upstream and downstream edges 58, 60 advantageously extending in a plane perpendicular to the axis of the cylindrical wall.

What is claimed is:

1. A flexible pipe for conveying a cryogenic fluid comprising:
    an inner corrugated tube having an axis, defining a plurality of corrugations opening radially towards the axis;
    at least one tensile armor layer, arranged around the corrugated tube;
    at least one thermal insulation layer, arranged around the armor layer; and
    an inner sheath for guiding the flow of cryogenic fluid arranged in the corrugated tube, the inner sheath being made up of a plurality of cylindrical segments,
    wherein each cylindrical segment of the inner sheath covers a plurality of successive corrugations of the corrugated tube and includes an outer abutment for axial wedging received in a corrugation of the corrugated tube, and
    each cylindrical segment can be moved relative to the corrugated tube over a given axial travel smaller than the pitch of the corrugations of the corrugated inner tube, the given axial travel being defined by the axial travel of the outer abutment in a hollow of a corrugation,
    each cylindrical segment comprising a cylindrical body made in a single piece with the outer abutment, the outer abutment being formed through local deformation of the cylindrical body.

2. The flexible tube according to claim 1, wherein each cylindrical segment defines an inner cylindrical surface with no asperities spaced axially away from the outer abutment.

3. The flexible tube according to claim 1, wherein each cylindrical segment has a downstream edge engaged through an upstream edge of an adjacent cylindrical segment.

4. The flexible tube according to claim 1, wherein each outer abutment extends angularly over an angle larger than 90° around the axis.

5. The flexible tube according to claim 1, wherein the outer abutment of each cylindrical segment extends axially across from a portion of an adjacent cylindrical segment.

6. The flexible tube according to claim 1, wherein the outer surface of each outer abutment is covered by a plastic sheath designed to come into contact with the corrugated tube.

7. The flexible tube according to claim 1, wherein each cylindrical segment is elastically deformable toward the axis between a radially expanded idle configuration and a radially contracted configuration, each cylindrical segment occupying its radially contracted configuration when it is inserted into the corrugated tube.

8. A flexible pipe for conveying a cryogenic fluid comprising:
- an inner corrugated tube having an axis, defining a plurality of corrugations opening radially towards the axis;
- at least one tensile armor layer, arranged around the corrugated tube;
- at least one thermal insulation layer, arranged around the armor layer; and
- an inner sheath for guiding the flow of cryogenic fluid arranged in the corrugated tube, the inner sheath being made up of a plurality of cylindrical segments,
- wherein each cylindrical segment of the inner sheath covers a plurality of successive corrugations of the corrugated tube and includes an outer abutment for axial wedging received in a corrugation of the corrugated tube, and
- each cylindrical segment has a slit along a generatrix over its entire length.

9. The flexible tube according to claim 1, wherein the pipe comprises a spiral layer for maintaining the tensile armor layer, the spiral layer being inserted between the armor layer and the thermal insulation layer.

10. A method for manufacturing a flexible pipe for conveying a cryogenic fluid, comprising the following steps:
- providing a corrugated inner tube with an axis defining a plurality of corrugations opening radially towards the axis;
- arranging at least one tensile armor layer around the corrugated tube;
- placing at least one thermal insulation layer around the armor layer; and
- arranging an inner sheath for guiding the flow of cryogenic fluid in the corrugated tube, the inner sheath being made up of a plurality of cylindrical segments,
- wherein each cylindrical segment of the inner sheath covers a plurality of successive corrugations of the corrugated tube and includes an outer abutment for axial wedging received in a corrugation of the corrugated tube, and
- each cylindrical segment can be moved relative to the corrugated tube over a given axial travel smaller than the pitch of the corrugations of the corrugated inner tube, the given axial travel being defined by the axial travel of the outer abutment in a hollow of a corrugation,
- each cylindrical segment comprising a cylindrical body made in a single piece with the outer abutment, the outer abutment being formed through local deformation of the cylindrical body.

11. The flexible tube according to claim 4, wherein each outer abutment extends angularly over an angle larger than 180° around the axis.

* * * * *